May 9, 1967 J. T. JOHNSON 3,318,155
SAMPLING OF LIQUIDS WITH STRATA OF VARYING COMPOSITION
Filed Aug. 14, 1964 2 Sheets-Sheet 1
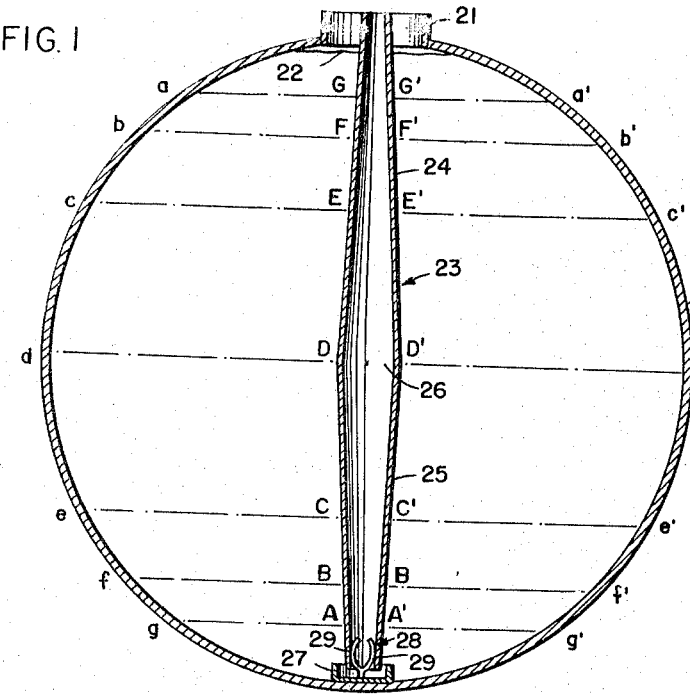
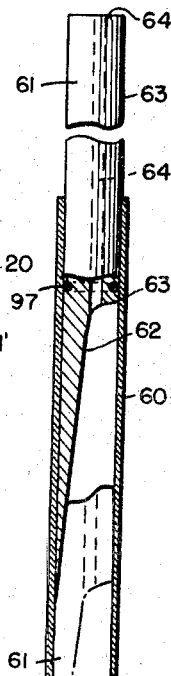
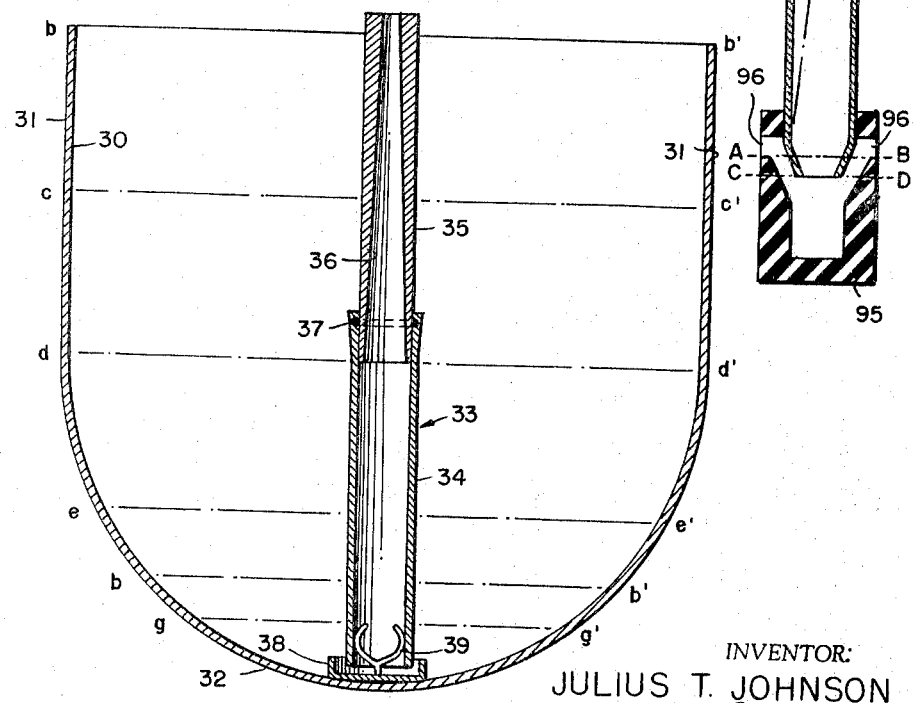
INVENTOR:
JULIUS T. JOHNSON
BY
ATT'YS

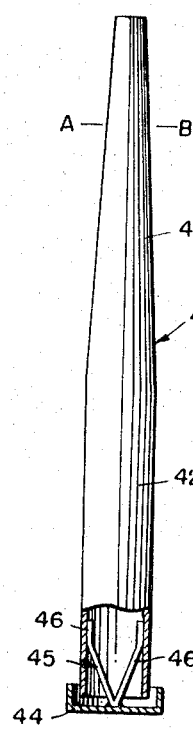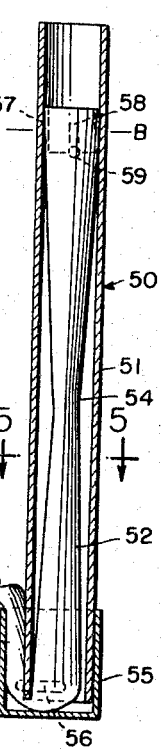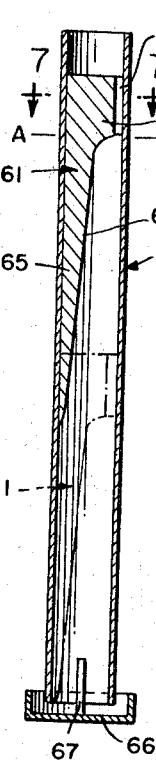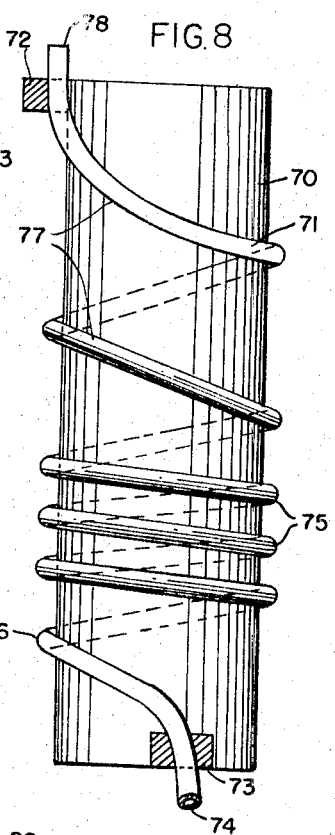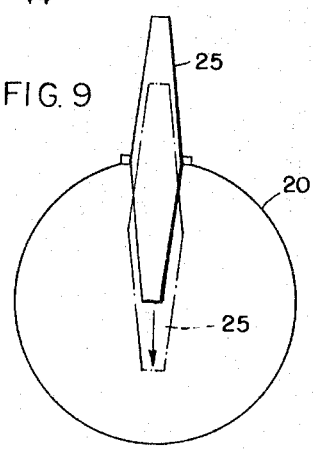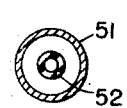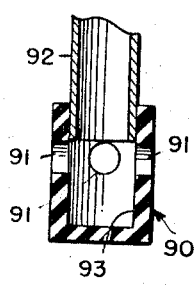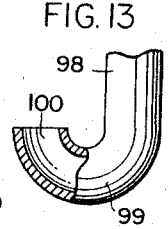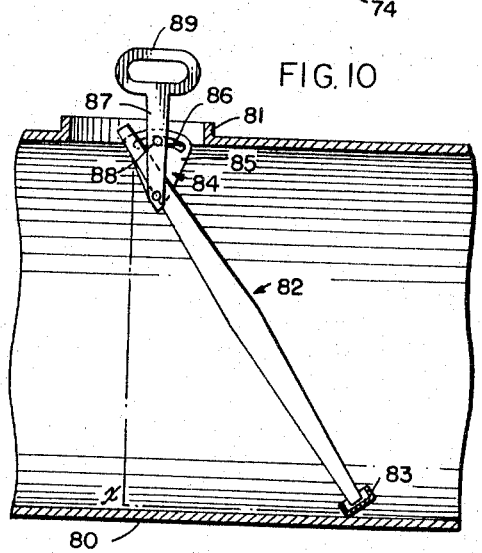

United States Patent Office 3,318,155
Patented May 9, 1967

3,318,155
SAMPLING OF LIQUIDS WITH STRATA OF VARYING COMPOSITION
Julius Theodore Johnson, 348 20th St. SE., Cedar Rapids, Iowa 52403
Filed Aug. 14, 1964, Ser. No. 389,748
11 Claims. (Cl. 73—425.4)

This invention, in general, relates to sampling of a body of liquid to obtain a representative sample, and, more particularly, relates to apparatus and processes adapted to be used to obtain an average, uniform sample of a liquid having strata at various depths of different compositions and different areas. The invention has particular application to sampling of a body of milk or the like in bulk tanks or like containers of various shapes and sizes to obtain a representative sample of the milk or the like.

Quick and accurate sampling of a large body of milk in a truck tank or storage tank must be done in a way such that the sample is drawn from at least a representative number of vertically spaced points in quantities proportionate to the weight or volume of the liquid in the various superposed layers from which the sample is taken. With a tank having vertical side walls, such as an upstanding cylindrical tank, a rectilinear tank and the like, equal volumes of milk may be drawn at equally spaced sampling points inasmuch as the samples are then drawn from layers of approximately equal volume.

However, where the tank and vertical cross-section does not have straight, parallel side walls, e.g., a spherical tank, a cylindrical tank lying on its side, a tank which is ovular or elliptical in vertical cross-section, a hyperbolic tank, and the like, the attainment of a true sample becomes more complicated. It is this area of sampling to which the invention has particular application. Here, the proportion of the sample increment taken at a given point to the total volume of the sample should be of substantially the same ratio as the proportion of the volume of liquid at said point relative to the total volume of the liquid in the tank.

Briefly, the sampling technique of the instant invention involves the lowering of a sampling tube, open at each end, into the body of liquid to be sampled. The tube is lowered at a rate such that the liquid level of the sample in the tube is maintained substantially even with the upper level of the body of liquid being sampled. The liquid picked up in the sampling tube flows through the open, lower end. Hence, as the tube is lowered from the upper surface of the liquid until it reaches the bottom of the tank, it is constantly sampling liquid from each stratum of the liquid. In effect, the number of strata sampled is infinite because the sampling is continuous from the top to the bottom.

To properly sample a liquid such as milk contained within a tank of varying horizontal cross-section, the amount of liquid drawn into the sampling tube from the various horizontal strata must be varied in corresponding proportions. Taking, for example, the cylindrical tank lying on its side, the zone or stratum of greatest volume of the liquid occurs in the diametric, horizontal plane of the tank. Assuming the tank to be completely filled, the stratum at the horizontal, diametric plane embodies a much greater volume than the stratum at the top or the bottom of the tank. It is, therefore, necessary, in order to obtain a representative sample of liquid of varying composition in different stratum, to draw a volume of sample into the sampling tube which is proportionate to the volume represented by the particular stratum. Hence, a much greater volume must be drawn into the lower end of the sampling tube as it passes through the aforesaid stratum at the diametric, horizontal plane of the cylindrical tank than is drawn into the sampling tube as it passes through the upper one inch stratum or the lower one inch stratum at the top and bottom of the tank, respectively.

To accomplish the aforesaid variation in increment volume of liquid collected in the sampling tube in proper relation to the relative volume of the strata increment being sampled at each given point during the travel of the sampling tube downwardly through the liquid being sampled, the sampling tube is constructed so that its free, cross-sectional area in the plane of the liquid level varies in proportionate relation to the variation of the horizontal cross-sections of the infinite increments of horizontal planes through the tank. Taking again the example of a cylindrical tank lying on its side, the free cross-sectional area of the inside of the sampling tube is the smallest cross-sectional area at the lower end of the tube. The liquid being sampled, the liquid entering the tube, is of minimum cross-section at the top of the tank. As the tube progresses downwardly toward the aforesaid horizontal, diametric plane of the tank, its free cross-sectional area becomes proportionately larger, reaching a maximum when the lower end of the tube reaches the aforesaid horizontal, diametric plane. At this point, the free cross-sectional area becomes progressively smaller in relation to the incremental cross-sectional areas of the liquid at the lower end of the tube.

The sampling techniques of the invention embody a mode of operation wherein the free area of lower portion of the sampling tube controls the proportion of liquid sample obtained from the upper part of the tank while the upper part of the sampling tube controls the proportion of liquid sample obtained from the lower part of the tank. All liquid enters the sampling tube at the lower end, but the amount of liquid taken from a given strata by said lower end is determined by the free cross-sectional area of the sampling tube in the plane of the liquid level in the tank. In other words, at each increment or stage of sampling, it is the free cross-sectional area of the sampling tube at the liquid level in the tank which determines the proportionate amount of sample taken.

It is, therefore, a primary object of this invention to provide improvements in the sampling of liquids having a tendency to stratify in layers of different composition to provide substantially accurate, average samples of said liquid.

Another object of the invention is to provide samplers for sampling liquids stratified in layers of different compositions for collecting a substantially accurate, average sample of said liquids.

Still another object of the invention is to provide improvements in processes of sampling liquids which stratify into layers of different compositions.

These, and other objects and advantages of the invention which will be made apparent to those skilled in the art from the following description of the invention, may be attained by the practice of the generic principles of the invention as further illustrated in the preferred embodiments thereof shown in the drawings wherein:

FIG. 1 is a vertical section through a cylindrical tank lying on its side and a sampling tube embodiment of the invention in its lowermost position of the sampling technique;

FIG. 2 is a vertical section through a tank having vertical, parallel side walls and a semicylindrical bottom wall and another embodiment of a sampling tube of the invention designed for use in a tank of this structure;

FIG. 3 is a side elevation, partly in section, of another embodiment of the sampling tube of the invention;

FIG. 4 is a diametric section through still another embodiment of the sampling tube of the invention;

FIG. 5 is a section taken on plane 5—5 of FIG. 4;

FIG. 6 is a vertical section in a diametric plane of still another embodiment of a sampling tube of the invention;

FIG. 7 is a section taken on plane 6—6 of FIG. 6;

FIG. 8 is a side elevation, partly in section, of still another embodiment of the sampling tube of the invention;

FIG. 9 is a schematic view of a tank and sampling tube similar to the tank and sampling tube shown in FIG. 1 and showing the sampling tube thereof in two positions during the sampling operation;

FIG. 10 is a sectional side elevation of a sampling tube of the invention in a cylindrical tank lying on its side, shown in vertical section, said figure illustrating the technique of sampling a cylindrical tank of greater diameter than the diameter of the tank for which the sampling tube was designed;

FIG. 11 is a section of the lower fragment of a sampling tube with a modified form of cap thereon;

FIG. 12 is a section of another sampling tube embodiment; and

FIG. 13 is a section of the lower end of another sampling tube embodiment.

Referring to the drawings, there is shown in FIG. 1 a cylindrical tank 20 lying on its side. The tank 20 has a fill tube or opening 21 at the top thereof by which the tank may be filled, or the opening 21 may be provided merely for the purpose of sampling the contents of the tank. Assuming that a tank to be filled with the liquid of variable compositions of various strata thereof, such as milk, the tank must be carefully sampled to that a proportionate volume of liquid from each level is withdrawn from the tank during sampling procedure; otherwise a representative sample of milk will not be obtained.

For sampling a tank such as shown in FIG. 1, the sampling tube as shown in this figure may be employed. The sampling tube is designed for sampling the tank when it is substantially filled with the liquid, i.e., a liquid having an upper level 22 substantially at the top thereof as shown in FIG. 1.

The sampling tube 23 comprises a tube open at both ends and having back-to-back segments 24 and 25 tapering from the widest point or node 26 located substantially at the center of the sampling tube. The sampling tube is lowered at a slow, preferably constant rate of speed into the tank 20 until the sampling tube reaches the bottom of the tank, the position shown in FIG. 1. As the tube is lowered, the liquid flows in the lower end of the tube and the liquid level inside the tube remains substantially even with the liquid level 22 in the tank at any given stage of the sampling process.

The lower end of the tube has thereon a cup-shaped gap member 27 bearing a spring clip mounting member 28 having a pair of spring arms 29 resiliently urged outwardly against the inner wall of the sampling tube to hold the cap in the desired position. This cap member forms a well in the liquid passage into the sampling tube. This desired position, relative to the lower end of the tube, is such that the liquid will flow substantially freely into the lower end of the tube so that the liquid level inside the tube remains substantially at the liquid level in the tank 20.

It will be appreciated from FIG. 1 that the amount of sample drawn into the tube must vary as the tube moves downwardly in the tank. For example, when the tube is moving through the strata shown at a–a′ near the top of the tank, the amount of sample taken into the tube must be substantially less than, for example, at other planes, i.e., at planes b–b′, c–c′, d–d′, etc. This is because the cross-section of any given strata varies with the vertical distance from which the sampling tube has travelled from the upper level of the liquid.

Therefore, assuming the tank to be full as shown in FIG. 1, it must take up progressively more sample per strata of the liquid as the tube travels from the upper liquid level 22 to the mid-point of the tank, i.e., the mid-plane d–d′. After the lower end of the tube passes the level d–d′, the sampling tube must take up gradually lesser amount of liquid per strata because the cross-section of the tank becomes progressively smaller until the tube reaches the lowermost point in the tank.

Therefore, in order to accomplish the proper sampling proportion, the internal, free cross-section in the sampling tube at the plane of liquid level 22 varies in accordance or proportionately with the relative ratios of the cross-section of the particular strata of the liquid being drawn into the lower end of the sampling tube. For example, assuming a tank as shown in FIG. 1, the strata at the mid-plane d–d′ represents the greatest cross-sectional area of the liquid in the tank. This means that when the lower end of the sampling tube 23 is in the plane d–d′, the tube 23 must have its largest cross-sectional area D–D′ substantially in the plane of the upper level 22 of the liquid in the tank (see FIG. 9). It is essential that the sampling tube be lowered at a sufficiently slow rate so that the level of liquid in the sampling tube remains substantially even with the upper level 22 in the tank. The tube is dimensioned so that internal cross-sectional area D–D′ of the sampling tube is in the plane of the liquid level 22 in the tank when the lower end of the sampling tube reaches the strata d–d′ of the tank. Therefore, the free cross-sectional area of the sampling tube must vary to meet the varying conditions of cross-sectional area of the tank as follows:

A sample is drawn into the sampling tube the moment the lower end of the tube 23 enters the liquid at the upper side of the tank. Taking several strata to illustrate representative conditions for the infinite strata of the tank, when the lower end of the sampling tube reaches the stratum a–a′, a proportionately greater volume or increment of sample must be drawn into the sampling tube because the cross-sectional area of the strata a–a′ is greater than the cross-sectional area of the upper level 22 of the liquid. In the illustrated case, the cross-sectional area represented by the level of the liquid in the sampling tube is the internal cross-sectional area of the sampling tube A–A′. A similar relationship exists at the stage of the sampling when the lower end of the sampling tube reaches the stratum b–b′, the liquid level of the sampling tube then being at the free cross-sectional area represented by B–B′ of the sampling tube. Similarly, the same applies for the stratum c–c′ and the internal cross-sectional area of the sampling tube C–C′, and so on through d–d′, e–e′, f–f′ and g–g′ and the corresponding cross-sectional area of the sampling tube D–D′, E–E′, F–F′ and G–G′, respectively.

Therefore, the sampling tube is constructed so that the internal cross-section of the sampling tube varies proportionately to the cross-sectional area of the sampling tank for each strata. The internal, free cross-sectional areas of of the sampling tube vary proportionately with the cross-sectional areas of the various strata represented by the corresponding points between the tank and the sampling tube at the point where the sampling tube is at the level 22 of the liquid in the tank. Taking as an illustration, let us assume that the cross-sectional area of the strata d–d' is 100 times larger than the cross-sectional area D–D' of the sampling tube. The same ratio between the cross-sectional areas of the sampling tube and the strata being sampled is maintained. In the above example, the ratio of the cross-sectional area of the stratum a–a' to the internal cross-sectional area of the sampling tube at the plane A–A' is 100:1. Similarly, the same is true of the ratio of cross-sectional area b–b' and internal cross-sectional area B–B'; and so on through the c, d, e, f and g series.

Thus, there is provided a method for sampling a liquid body with horizontal strata of varying composition, which strata at various depths vary in cross-sectional area, said method comprising slowly lowering a sampling tube having a varying free-cross sectional area from the upper level of said liquid substantially to the bottom thereof, drawing liquid sample into said tube from the liquid body as it is lowered therethrough only through the lower portion of said tube while maintaining the liquid level in said tube substantially even with the upper liquid level of said liquid body, and maintaining throughout the sampling operation a ratio of free cross-sectional area in said sampling tube at said liquid level to maximum cross-sectional area in said sampling tube substantially equal to the ratio of cross-sectional area of the particular stratum from which sample is drawn into the lower end of the tube to the stratum of maximum cross-section.

When the sampling tube has been fully inserted in the tank so that the cap 27 touches the bottom wall, the sampling tube is tilted to take up additional liquid. By then capping or closing off the upper end of the sampling tube with the finger, thumb, or the like, the sampling tube may be withdrawn without entry of air into the air space above the liquid in the sampling tube. As the sampling tube is withdrawn from the liquid, the pressure head of the liquid in the sampling tube will cause some liquid to flow out of the tube. This loss is compensated by the aforesaid tilting of the sampling tube to a degree causing an amount of over-filling about equal to the amount of fluid which is lost as the tube is withdrawn. The fluid column in the sampling tube will drop until the pressure in the sealed air space above the liquid column is the difference between the weight of the column and the atmospheric pressure on the liquid in which the bottom of the sampling tube is immersed. Thus, if there is a 3 foot column of water in the sampling tube, the difference in air pressure would be about 3/33 or 1/11 atmosphere, or, as the column is raised, the air space would increase 1/11 of its total volume and the air pressure decreases 1/11. With an air space of 11 cubic inches in the upper part of the sampling tube, it would be angled to overfill 1 cubic inch. This 1 cubic inch of liquid would then escape back into the tanks as the sampling tube is lifted, and the air space would be 11 cubic inches again. The complete sample would still be in the sampling tube. The withdrawn sample is then released into a suitable container and is ready for analysis as a substantially true, representative sample of the over-all composition of the liquid in the tank.

In FIG. 2 there is shown another type of tank and a sampling apparatus adapted for use therein. The tank 30 comprises a tank having parallel vertical side walls 31 and a semicylindrical bottom wall 32. The cross-sectional area of the strata in the tank in the upper portion between the parallel walls 31 is a constant cross-sectional area, whereas the cross-sectional area in the various strata in the semicylindrical, bottom portion varies with the depth of the tank. Therefore, the sampling tube must be adapted to sample proper proportions for a tank of this character.

This is achieved by employing a sampling tube 33 comprising a lower, cylindrical tubular member 34 having a constant cross-section and an upper tube portion 35 telescopically fitted in the lower tube 34. The outer wall of the tube portion 35 is of constant cross-section and substantially matingly fits in the cylindrical lower tube portion 34. The inner wall of the upper, tubular portion 35 is tapered so that it has a proper proportionate cross-section to sample the gradually decreasing cross-section of the strata of the tank in the lower, semicyclindrical portion.

The telescopic nature of the sampling tube adapts it to be used in tanks of the character described at any level of fill of liquid therein. The sampling tube is adjusted to the particular height of the liquid by placing the sampling tube in fully inserted position and telescoping the members so that the lower end of the tube portion 35 is at the stratum d–d', which strata represents the point at which the vertical side walls of the tank change into the semicylindrical portion. When the sampling tube is lowered in the tank, the cylindrical portion 34 of constant internal area samples liquid at the strata b–b', c–c', d–d', etc. As the liquid cross-sectional area becomes less as the lower end of the sampling tube passes into the semicylindrical portion of the tank, the incremental volume of sample drawn into the sampling tube is determined by the cross-sectional area of the internal wall 36 of the upper portion 35 of the sampling tube, thereby decreasing the proportion of amount of liquid being drawn into the sampling tube as it is lowered until it reaches the bottom of the tank. The joint between the two tube sections is liquid sealed by a sealing O-ring 37.

The cross-sectional area of the inner portion of the tubular portion 35 tapers proportionately to the change in cross-sectional area of the tank, that is the lower, semicylindrical portion thereof, from the stratum d–d' to the bottom of the tank in the manner previously described.

The lower end of the sampling tube 33 has provided thereon a cap 38 held in the lower portion by the springable arms 39, which are of the character heretofore described with regard to the embodiment of FIG. 1. The liquid flows into the lower end of the tube, i.e., the annular space between the inside of the cap 38 and the lower edge of the tube 34. Furthermore, the cap 38 may be made of a suitable elastomeric material such as natural or synthetic rubber and may be utilized to provide a sealing surface against which the lower edge of the tube 34 presses when it is desired to seal off the end of the tube at the end of the sampling operation. When the lower end of the tube is not sealed, the upper end should be sealed against air penetration when the sampling tube is withdrawn from the sampling tank.

The sampling tube 41 in the embodiment of FIG. 3 is a sampling tube made out of an inexpensive material such as thermoplastics, waterproofed paper, etc., so that the sampling tube 41 is of disposable nature, i.e., one to be thrown away after one sampling or a few operations. The illustrated sampling tube is designed for sampling a tank of the character of FIG. 2 and comprises a lower, cylindrical portion 42 of constant internal cross-section. The upper portion comprises a tapered portion having a tapered internal wall corresponding to the nature of the taper of the upper segment 35 in the embodiment of FIG. 2. The sampling tube may be adjusted as to various heights of liquid in the sampling tube by cutting off the lower end of the sampling tube to provide the proper height of the lower segment 42, thereby providing a sampling tube similar to the sampler shown in FIG. 2.

The lower end of the sampling tube 41 is provided with a cap similar to those caps previously described. The cap 44 is held in the lower end of the tube by means of a friction member 45 comprising springable arms 46 adapted to hold the cap in the tube.

The sampling tube 50 of FIG. 4 is a sampling tube of a hollow, cylindrical shape having a constant internal cross-section. The variation in internal cross-section of the sampling tube is achieved by the employment of a filler member 52, which in the illustrated case is a hollow, rubber tube tapering from its two opposite ends to a node of minimum diameter 54. The sampling tube 50 in the embodiment of FIG. 4 is adapted to a sampling tank of the character shown in FIG. 1, i.e., a cylindrical tank lying on its side, the sampling node 54 being positioned to be at the upper level of the liquid when the lower end of the sampling tube is at stratum $d$–$d'$ of the tank shown in FIG. 1. In order to adjust for sampling a tank which is not filled to the top, the flexible tube can be slidably moved in the sampling tube 50 so that the position of the node 54 can be adjusted with relation to the lower end of the tube 51. This positioning is achieved by making the lower end 53 of the hollow, rubber tube long enough so that it can be bent around and extend outwardly from a cap 55 provided over the lower end of the sampling tube. The end 53 may be pulled farther out of the cap 54 or pushed in to change the location of the node 54 with relation to the lower end of the tube 51. The cap 55 has an aperture 56 in its side wall which allows the flow of liquid through the cap 55 and into the lower end of the sampling tube during the sampling process.

If desired, the upper end of the filler tube 52 may be filled with a solid filler member 57 which aids in frictionally holding the upper end of the filler tube 50 in position in the sampling tube 51. The filler member is provided with a vent hold 58 communicating with an aperture 59 in the wall of the filler member 52 so that the free area between the inner wall of the sampling tube 51 and the outer wall of the filler tube 52 is communicated with the atmosphere. The top of the tube is sealed by thumb or finger pressure or the like when the sampling tube is withdrawn, whereby air pressure keeps the sample in the tube as aforedescribed.

The sampling tube 60 shown in the embodiment of FIG. 6 comprises another type of sampling tube adapted to sample a tank of the character shown in FIG. 2. The sampling tube 60 comprises a hollow, cylindrical tube of constant internal cross-section. The tube has slidably fitted therein a filler member or plug 61 having a lower arm portion or tongue 65 providing a sloping surface 62. The filler member 61 further comprises a head portion 63 frictionally and slidably engaging the inner wall of the sampling tube 60. The head portion 63 has a vent or space 64 communicating the sampling area of the sampling tube 60 with the atmosphere.

The lower end of the tongue 65 of the filler member or plug 61 is located so that the distance from its lower end to the lower end of the tube 60 corresponds to the depth of liquid in the tank portion which comprises the upper, parallel, vertical side walls 31 (FIG. 2). Thus the lower portion of the sampling tube draws in a constant volume sample from each strata until the sampling tube is lowered a distance sufficient so that the upper level of the liquid in the sampling tube is even with the lower end of the tongue 65. At this point the sampling tube takes in less volume, which becomes progressively less as the sampling tube penetrates deeper in the tank. The free cross-sectional area of the sampling tube between the surface 62 and the inner wall of the tube 60 varies proportionately to the change in cross-sectional area of the liquid in the tank as one proceeds downwardly from the strata $d$–$d'$ to bottom of the tank.

The sampling tube 60 in the embodiment of FIG. 6 is provided with cap member 66 of similar nature to the cap members previously described on which the cap member may be slidably and frictionally held in the lower end of the tube 60 by means of spring arms 67.

The sampling device in the embodiment of FIG. 8 comprises a coiled tube of constant, internal cross-sectional area, although it is contemplated that the tube of nonuniform cross-sectional area may also be employed. The latter type tube is more difficult, however, to calibrate than a tube of constant, internal cross-sectional area.

The tube 71 of constant, internal cross-sectional area is spiralled or coiled at different pitches of the respective spirals or coils. For convenience, the sampling tube 71 may be coiled about a cylindrical member 70 having a density greater than the liquid being sampled so that the sampling tube sinks relatively easily into the sampling liquid. The tube is held at its upper end by means of an ear 72 having a hole therethrough through which extends the upper end 78 of the tube 71. Similarly, the lower end 74 of the sampling tube projects through a hole in the lower ear 73, the lower end 74 of the sampling tube being the end in which liquid enters the tube 71 during sampling process.

In the embodiment illustrated in FIG. 8, the tube is shown in an arrangement whereby it is employed to sample a tank of a cylindrical nature lying on its side, i.e., a tank of the character shown in FIG. 1. In this instance, however, the tank is only partially filled to a level above mid-level, i.e., a level corresponding substantially to the stratum $c$–$c'$ (FIG. 1). The upper strata are sampled by the lower portion of coiled sampling tube 71, e.g., the portion of the tube from the lower end 74 through the coil portion 76. The mid coils 75 are the coils which sample liquid at the mid-level of tank, whereas the upper coils 77 sample liquid in the lower portion of the tank.

The illustrated embodiment shows the differences in pitches of the various coils, the coils 75 having a smaller pitch and, therefore, sampling greater incremental volumes than the coil portions 76 at lower end and coil portions 77 at the upper end of the coiled tube. The effective free cross-sectional area inside the tube varies in accord with its pitch. The liquid in the coiled tube remains level, and the more the tube is tilted from the horizonal, e.g., by increasing the pitch of the coils, the less is the area of the liquid level. Therefore, the pitch of the coil at the upper level of the liquid body controls the effective free cross-sectional area inside the tube at the upper level of the liquid. The tube is vented to the atmosphere by having upper portion 78 of the coiled tube 71 remain above the liquid level during the entire sampling operation.

FIG. 10 shows the technique of sampling tank having a smaller diameter than the diameter for which the sampling tube was originally designed. In FIG. 10 there is shown a cylindrical tank 80 lying on its side and having an opening or port 81 in upper surface thereof. The sampling tube 82 is designed for sampling a tank of the aforesaid character but of a larger diameter. Therefore, the shape of the sampling tube 82 corresponds, for example, to the sampling tube shown in FIG. 1. The lower end of the sampling tube has a cap 83 supported in the manner previously described in the lower end of the tube.

A sampling technique illustrated in FIG. 10 comprises a lowering of the sampling tube at an angle with respect to the vertical into the tank. The angle is adjusted so that the vertical distance from the uppermost sampling portion of the tube 82 to the point X, which is in the horizontal plane of the lower end of tube 82, is equal to the diameter of the smaller tank 80. The sampling tube is held in this orientation by mounting the sampling tube 82 on a bracket member 84 rigidly holding the tube thereon. The bracket 84 has a vertical plate 85 having an arcuate slot 86. The shank of a handle 87 is pivotally mounted on the bracket 84 and is angularly adjustable with relation to the bracket. It is held in any desired, adjusted position by means of a nut 88 extending through the shank 87 and secured by a bolt or other suitable means with relation to the bracket 84. The handle 89 is used to hold the unit in the illustrated orientation as the tube is lowered through the tank. In this orientation, the sampling tube of longer length than the tank for which it was designed is thereby capable of being employed without having to obtain a different sampling tube designed for the particular tank diameter.

FIG. 11 shows a compression cap 90 constructed from elastic material, such as rubber. The cap is held in place by friction on the outside of the tube with openings 91 below the lower edge of sampling tube 92. This cap is closed by pushing the cap against the bottom of the tank. When this type of seal is used, the top of the tube need not be sealed. The cap is slidable on the tube and, as pressure is applied, the circular end of the tube 92 is forced into the tapered portion 93 of the cap 90, making a complete seal. When this type of cap is used, the liquid is poured out of the top of the tube into a suitable container.

The cap 95 shown on the bottom of the tube 60 of FIG. 12 is a combination of the two caps explained before, and can be used as either an air seal as in FIGS, 1, 2, 3, 4, 6 and 10 or as a compression seal as FIG. 11. When the cap 95 is used as an air seal, the cap is put on the tube with the end of the sampling tube pushed down into the cap to the line C–D. Since the liquid level in the cap will stay at the levels A–B, i.e., the lower edges of the cap openings 96, the air pressure on surface of liquid will hold the sample the same as the caps shown in FIGS. 1, 2, 3, 4, 6 and 10 and the operation when used in this way is the same. The cap 95 shown in FIG. 12 can also be used as a friction seal the same as the cap 90 in FIG. 11 in which event the operation would be the same as the explanation of operation of the cap 90 in FIG. 11.

The embodiment of FIG. 12 is similar in other respects to the embodiment of FIG. 6, except the filler section 61 is extended so that it extends above the top of the tube 60 when it is completely down in the tube. This decreases the air space above the liquid when using the vacuum seal and also makes it the same each time regardless of the distance down to the liquid. With this construction it is also possible to use friction seal cap of FIG. 11 to close the bottom of the tube. The filler member 61 may then be removed, and the sample poured out through the top of the tube. The filler member 61 can also be removed completely, and the sampling tube used for straight side tanks. The O-ring 97 is placed about the displacer member 61 to complete the seal.

The air seals provided by caps 27, 38, 44, 55 and 83, for example, are formed by the liquid wells in the caps covering the lower end of the sampling tube. Another way to achieve this type of seal is shown in FIG. 13 wherein the lower end of the sampling tube 98 has a 180° elbow 99 providing an upwardly facing opening 100. The liquid well in this case occurs in the elbow 99 whereby, as in the wells of the aforesaid caps, air is prevented from entering the lower end of the sampling tube when it is raised out of the liquid.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A method for sampling a liquid body with horizontal strata of varying composition, which strata at various depths vary in cross-sectional area, said method comprising slowly lowering a sampling tube having a varying free cross-sectional area from the upper level of said liquid substantially to the bottom thereof, drawing liquid sample into said tube from the liquid body as it is lowered therethrough only through a passage of constant effective area at the lower portion of said tube while maintaining the liquid level in said tube substantially even with the upper liquid level of said liquid body, and maintaining throughout the sampling operation a ratio of free cross-sectional area in said sampling tube at said liquid level to maximum cross-sectional area in said sampling tube substantially equal to the ratio of cross-sectional area of the particular stratum from which sample is drawn into the lower end of the tube to the stratum of maximum cross-section.

2. A process as claimed in claim 1 wherein said sample is collected in a straight tube having variable, transverse, free cross-sectional areas.

3. A process as claimed in claim 1 wherein said sample is collected in a tube which is coiled in coils of variable pitch.

4. A sampling tube for sampling a liquid body of variable composition in variable area, horizontal strata thereof comprising a tube having at its lower end a liquid passage of constant effective area sufficient for free flow of liquid into the lower end of said tube at a rate sufficient to keep the liquid level in said tube substantially even with the upper level of the body of liquid being sampled as said tube is lowered slowly in substantially vertical orientation into said liquid body from the upper level of said liquid body substantially to the bottom thereof, means for venting the portion of said tube above the level of liquid sample therein to the atmosphere as said tube is lowered into said liquid body, sample volume control means only along the inner surface of said tube and providing varying, unbroken, free, transverse cross-sectional areas along at least a portion of the length of said tube to maintain throughout the sampling operation a ratio of unbroken, free cross-sectional area in said sampling tube substantially even with the upper level of said liquid body to the maximum cross-sectional area in said sampling tube substantially equal to the ratio of cross-sectional area of the particular stratum from which sample is drawn into the lower end of the tube to the stratum of maximum cross-section, and a well in said liquid passage adapted to be filled with liquid to a level sufficient to prevent upward flow of atmospheric air into the lower end of said tube when the latter is withdrawn vertically from the liquid being sampled.

5. A sampling tube as claimed in claim 4 wherein said tube is a straight tube and said sample volume control means comprises at least a portion of said tube having the inner wall thereof tapered at a predetermined taper providing said proportionate volume of sample.

6. A sampling tube as claimed in claim 5 wherein said tube comprises straight, back-to-back tubular segments, each segment having an inner wall tapering from the general mid-portion of said sampling tube toward the respective ends thereof.

7. A sampling tube as claimed in claim 4 wherein said tube is a straight tube of uniform free cross-section, said sample volume control means comprises a plug slidably mounted in said tube and a tongue depending from one side of said plug of varying thickness providing variable free cross-section in the areas of said tube opposite said tongue and vent means connecting the portion of said tube below said plug with the atmosphere above said plug.

8. A sampling tube comprising a tube open at the lower end thereof, through which opening liquid sample flows into said tube, a cap extending across said opening and normally spaced therefrom to allow liquid sample to flow into said tube, and means in said cap forming a well adapted to be filled with the liquid being sampled to a level covering said opening when said tube is held vertically.

9. A sampling tube as claimed in claim 8 wherein said cap has spring arms engaging the inner wall of said sampling tube.

10. A sampling tube for sampling a liquid body of variable composition in variable area, horizontal strata thereof comprising a first, straight, tubular segment of uniform circular cross-section and a second, straight, tubular segment having an inner wall tapering from said first segment toward the outer end of said second segment, the outer ends of said first and second segments being open, the tapering inner wall of said second segment providing a varying free cross-sectional area of said tube so that liquid sample drawn into the lower end of said tube as it is lowered in said liquid body of variable composition is representative in proportionate volume of sample to the proportionate volume of the liquid at the particular strata where the sample is being drawn into the lower end of the tube, and the uniform circular cross-section of said first segment being adapted for sampling a portion of said liquid body having a substantially constant area in the horizontal starta thereof.

11. A sampling tube as claimed in claim 10, wherein said second segment is telescopically mounted in said first segment.

References Cited by the Examiner

UNITED STATES PATENTS

| | | | |
|---|---|---|---|
| 1,603,712 | 10/1926 | Peck | 73—425.4 |
| 2,164,498 | 7/1939 | Clark | 73—424 |
| 2,782,640 | 2/1957 | Croft et al. | 73—425.4 |
| 3,084,592 | 4/1963 | Scott | 73—425.4 |
| 3,177,723 | 4/1965 | Pedersen | 73—425.4 |

FOREIGN PATENTS 1,341,764  10/1964  France.

LOUIS R. PRINCE, *Primary Examiner.*

D. M. YASICH, *Assistant Examiner.*